(12) United States Patent
Mans et al.

(10) Patent No.: US 10,293,278 B2
(45) Date of Patent: May 21, 2019

(54) SELF-CONTAINED WATER AND OIL SEPARATOR

(71) Applicant: Reliable One Resources Inc., Lake Tahoe, NV (US)

(72) Inventors: Derek Mans, Colorado Springs, CO (US); Tom Warnes, Silverthorne, CO (US)

( * ) Notice: Subject to any disclaimer, the term of this patent is extended or adjusted under 35 U.S.C. 154(b) by 0 days.

(21) Appl. No.: 15/280,540

(22) Filed: Sep. 29, 2016

(65) Prior Publication Data

US 2017/0113163 A1 Apr. 27, 2017

Related U.S. Application Data

(60) Provisional application No. 62/234,892, filed on Sep. 30, 2015, provisional application No. 62/276,598, filed on Jan. 8, 2016.

(51) Int. Cl.

| | | |
|---|---|---|
| *C02F 1/40* | (2006.01) | |
| *B01D 17/02* | (2006.01) | |
| *B01D 33/48* | (2006.01) | |
| *B01D 36/04* | (2006.01) | |
| *B01D 33/04* | (2006.01) | |
| *C02F 1/24* | (2006.01) | |
| *C02F 11/123* | (2019.01) | |
| *C02F 1/44* | (2006.01) | |
| *C02F 101/32* | (2006.01) | |

(52) U.S. Cl.
CPC ......... *B01D 17/0214* (2013.01); *B01D 33/04* (2013.01); *B01D 33/48* (2013.01); *B01D 36/04* (2013.01); *C02F 1/24* (2013.01); *C02F 1/40* (2013.01); *C02F 11/123* (2013.01); *C02F 1/44* (2013.01); *C02F 2101/32* (2013.01); *C02F 2303/16* (2013.01); *Y02W 10/37* (2015.05)

(58) Field of Classification Search
CPC .... B01D 17/0214; B01D 33/04; B01D 33/48; B01D 36/04; C02F 1/40
USPC .... 210/122, 242.3, 297, 298, 299, 391, 400, 210/540, 804
See application file for complete search history.

(56) References Cited

U.S. PATENT DOCUMENTS

| | | | | |
|---|---|---|---|---|
| 3,012,677 A | * | 12/1961 | Hungate | B01D 29/09 210/299 |
| 3,225,928 A | * | 12/1965 | Black | B01D 33/04 210/400 |
| 4,238,333 A | * | 12/1980 | Tidwell | B01D 17/0214 210/540 |
| 4,468,320 A | * | 8/1984 | Schmidt | B01D 33/044 210/297 |
| 4,992,167 A | * | 2/1991 | Uchiyama | B01D 33/50 210/391 |

(Continued)

*Primary Examiner* — Christopher Upton
(74) *Attorney, Agent, or Firm* — Braxton Perrone, PLLC

(57) ABSTRACT

A system and method for the separation of oil and water. Contaminated water is introduced into a settling and separating bowl through an inlet pipe. The contaminants float to the top and are recovered by a weir skimmer. The weir skimmer is fluidly connected to a recovered oil tank which receives the recovered oil. An oil separator filter belt is located in the separating bowl and separates the bowl into two segments: an upstream end on the side closest to the inlet and a downstream end on the opposite side of the inlet of the belt. The oil separator filter belt aggregates entrapped and entrained oil and other contaminants.

8 Claims, 2 Drawing Sheets

(56) References Cited

U.S. PATENT DOCUMENTS

| | | | | |
|---|---|---|---|---|
| 5,462,677 A * | 10/1995 | Benesi | ............... | B01D 25/1275 210/400 |
| 5,738,782 A * | 4/1998 | Schafer | .............. | B01D 21/0006 210/521 |
| 2008/0190834 A1* | 8/2008 | Urquhart | ............ | B01D 21/0012 210/299 |

* cited by examiner

SELF-CONTAINED WATER AND OIL SEPARATOR

PRIORITY

The present invention claims priority to U.S. Provisional Application No. 62/234,892 entitled "Self-Contained Water and Oil Separator" filed Sep. 30, 2015. The present invention further claims priority to U.S. Provisional Application No. 62/276,598 entitled "Self-Contained Desalination Unit" filed on Jan. 8, 2016. The entirety of both of these provisional applications are incorporated herein by reference.

BACKGROUND OF THE INVENTION

Technical Field

The present invention relates to a medium volume self-contained oil contaminated water oil separator and dewatering filter incorporating redundant floating weir oil skimmer.

Description of Related Art

Commercial and industrial activities often produce wastewater streams with oil entrapped or entrained within the water. Disposal of oil fouled or oily water is expensive and may require environmental mitigation or hazardous waste disposal. Current technology to remove oil from water is expensive, cumbersome, requires excessive power, and has extremely large footprint. By integration and utilization of new and enhanced oil recovery technologies, this invention reduces initial startup costs and maintenance costs, as well as being extremely power efficient and operating in a small, compact, and portable unit.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
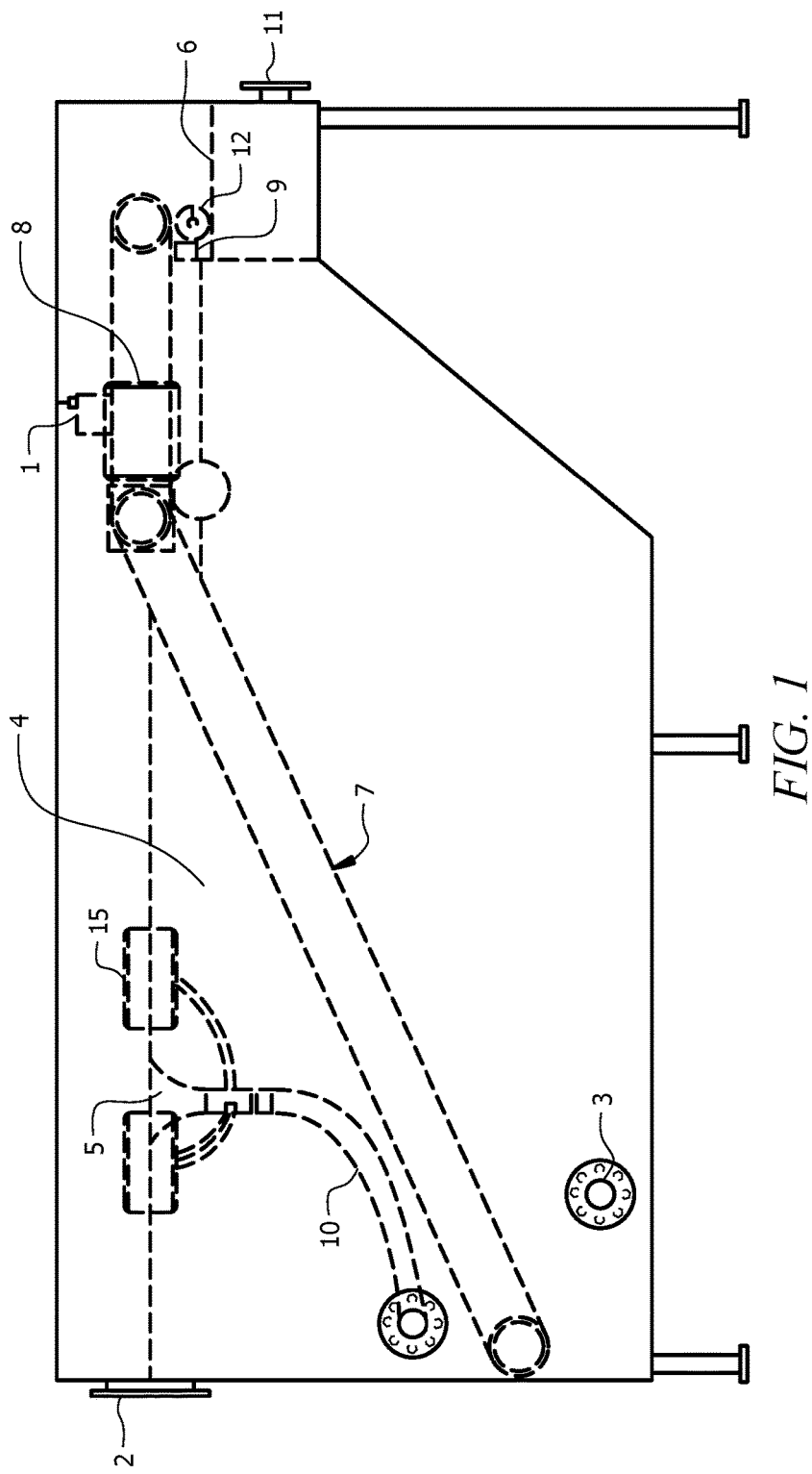
FIG. 1 is a schematic view of the oil separator in one embodiment.

Turning now to FIG. 1, FIG. 1 is a schematic view of the oil separator in one embodiment. This figure is for illustrative purposes only and should not be deemed limiting. In one embodiment, and as depicted, the separator comprises one single vessel offering a reduced footprint compared to prior separators.

In one embodiment, the power input 1 provides power to the separator. The power input 1 can be connected to the electrical grid, a generator, batteries, solar power, solar panels, etc. In one embodiment the power input 1 comprises an electric motor. In one further embodiment the power input 1 comprises a DC motor with an integral gear box. In other embodiments the power input 1 can comprise motors without gearboxes such as direct drive motors, AC motors, both with and without gearboxes. Those skilled in the art will understand the sizing and power requirements necessary for the power input 1.

The separation unit can comprise virtually any size dependent upon the desired flow rate. In one embodiment the unit comprises a size of about 3 feet tall, 8 feet in length, and about 4 feet wide. This is for illustrative purposes only and should not be deemed limiting.

As depicted, contaminated water is introduced to the settling and separating bowl 4 through the inlet pipe 2. This is for illustrative purposes only and should not be deemed limiting. The contaminated water can be introduced into the bowl via any method or device known in the art.

The flow rate of contaminated water will depend upon several factors, including but not limited to, the size of the separation unit, the chemical composition of the contaminated water, and other factors. The flow rate will also be dependent upon the substrate and chemical composition of the membrane, discussed in more detail below. In one embodiment the separator unit is sized to receive between about 5 and 50 gallons per minute. As noted, this flow rate can be scaled upward or downward depending upon the system requirements.

As used herein, contaminated water comprises water and at least one hydrocarbon, such as oil, in undesirable quantities. In one embodiment contaminated water comprises hydrocarbons in amount up to and above 250,000 ppm. The contaminated water can further contain other contaminates such as chlorides, aluminums, arsenic, beryllium, boron, cadium, chromium, cobalt, copper, fluoride, iron, lead, lithium, manganese, molybdenum, nickel, selenium, vanadium, and zinc. In one embodiment, contaminated water comprises contaminants in a greater concentration which is typically allowed for drinking water. In another embodiment the contaminants can include benzene, toluene, ethylbenzene, zylene, polycyclic aromatic hydrocarbons, naturally occurring radioactive materials (NORMS), heavy metals and other volatile organic compounds (VOC). Other contaminants can include fracking or drilling chemicals, volatile and semi volatile organic compounds, salts, methylene chloride, formaldehyde, chloroform, bromodichloromethane, In one embodiment the separation unit removes and separates many of these contaminants from the contaminated water.

While in one embodiment the separation of oil will be described, this is for illustrative purposes only and should not be deemed limiting. While the separation unit separates oil, it also separates other contaminates including other hydrocarbons.

The size and configuration of the separating bowl, in one embodiment, are designed to reduce the turbulence inside the bowl. This helps contaminants such as oil to separate from the water and float to the surface. Oil that separates from the water will float to the top of the bowl and be removed by the weir oil skimmer 5.

The weir oil skimmer 5, in one embodiment, pipes recovered oil directly into the recovered oil tank 6. In one embodiment recovered oil refers to a substance which is greater than 50% by weight contaminants. As depicted the weir oil skimmer 5 is fluidly connected to an oil skimmer recovery pipe 10. In one embodiment the oil skimmer recovery pipe is flexible which allows the weir oil skimmer 5 to bob and float along the surface. In other embodiments the oil skimmer recovery pipe is rigid, holding the weir oil skimmer 5 in one specific and fixed location. In one embodiment the oil skimmer recovery pipe 10 is fluidly connected to the recovered oil tank 6. As depicted, the weir is supported by one or more floats 15. These floats 15 float upon the surface of the water. The height of the weir 5 relative to the floats 15 can be adjusted and fine-tuned in order to ensure that only the top layer of the contaminants is introduced and recovered by the weir 5. If the user determines that water is being introduced into the weir 5, then the height of the weir 5 needs to be increased.

In one embodiment oil, hydrocarbons, and other contaminants float to the top of the water bowl whereby they are captured by the weir oil skimmer 5 which is positioned so that it captures only the top layer of contaminants. In some embodiments the hydrocarbons, oil, and other contaminants will form a phase break and rise to the top forming a top layer of contaminants. By adjusting the height of the weir oil skimmer 5 to coincide with the location of the top layer, a high concentration of contaminants can be removed via the skimmer 5. This increases efficiency of the oil separator by preventing these contaminants from needing to be removed by the separator filter belt, as discussed below.

As noted, in one embodiment the height and location of the skimmer 5 can be adjusted. The height of the skimmer 5 can depend upon a variety of factors including the volume in the bowl 4, as well as the type and concentration of the contaminants in the water.

Various types of skimmers can be utilized. In one embodiment a floating weir skimmer manufactured by Megator Corporation of Pittsburgh Pa. is used. The weir has a floating skimmer and a variable weir as well as a sliding shoe pump. The weir can comprise virtually any material including stainless steel, thermoplastic, other stainless and ferrous steels, carbon composites, rubber, fiberglass, and other metals. The pump associated with the weir, not depicted, in one embodiment can comprise any designated self-priming pump designed for transferring flammable and/or explosive materials.

Also depicted as being located in the settling and separating bowl 4 is the oil separator filter belt 7. The oil separator filter belt 7 will aggregate entrapped and entrained oil, allowing the oil skimmer 5 to remove the oil out of the settling and separating bowl 4. The oil separator filter belt 7 also removes debris from the water as it travels. In operation, as the oil separator filter belt 7 passes through the bowl 4, entrained and entrapped oil attach to the surface of the belt 7. The belt 7 is then directed to the top of the bowl 4. Aggregated oil is then allowed to float to the top of the bowl where it is collected by the skimmer 5.

The separator filter belt 7 breaks the bowl 4 into two segments: an upstream segment and a downstream segment. An upstream segment, as used herein, refers to a portion of the bowl 4 which is closer to the inlet pipe 2 and which is to the inlet pipe 2 side of the filter belt 7. A downstream segment, as used herein, refers to a portion of the bowl 4 which is beyond the filter belt 7. Referring to FIG. 1, the left side of the figure above the filter belt 7 is the upstream segment whereas the right side of the figure below the filter belt 7 is the downstream segment. In one embodiment water and contaminants must pass through the filter belt 7 before they can advance to the downstream segment. As such, in some embodiments, the filter belt 7 acts as a physical barrier between the upstream segment and the downstream segment. In one embodiment contaminated water is located in the upstream segment whereas cleaned water is located in the downstream segment.

The separator filter belt 7 in one embodiment serves multiple purposes. First, the filter belt 7 acts as an oil water separator. Second, the filter belt 7 acts as a filtration device.

The separator filter belt 7 can comprise a variety of materials. In one embodiment the filter belt 7 comprises an oil phobic material such that water passes through the belt and oil remains behind on the belt 7 to be later skimmed off the surface of the bowl 4 by the skimmer 5. Thus, the separator belt 7 acts as a filter to capture solids and other particulates and components located in the contaminated water. Because the belt 7 acts as a filter, the filter screen size can be varied and adjusted to allow or remove the desired contaminants. The screen size on the filter, for those embodiments utilizing a screen, can be adjusted depending upon the contaminants, the concentration, flow rate, etc.

The belt 7 can comprise metals, fabric, cotton, polyester, rubber, polypropylene, carbon composite, fiberglass, and virtually any other material that has the ability to be perforated. In one embodiment the belt comprises a mesh screen. In other embodiments the belt comprises a screen material made from any of the above materials as well as fiberglass, poly blends, brass, stainless steel, copper, titanium, and fabric. In one embodiment the belt comprises a conveyor belt such as a chain drive with a membrane located atop the chain. In one embodiment the belt is 36 inches wide with a balanced Mesh B-72-24-16-16WD, made of T304 with welded selvages. The chain is RC40 T304 stainless steel.

As can be seen, the belt is driven by a variety of rollers, sprockets, etc. These can comprise virtually any material, including any of the metals, composites, or thermoplastics disclosed herein.

As noted, in one embodiment the belt 7 is coated with a membrane. In one embodiment the membrane is oil phobic which prevents a portion of the oil, grease, and paraffin from passing through the membrane. These contaminants, instead, are collected atop the membrane. In one embodiment the membrane comprises an oil repellant.

In one embodiment the belt 7 is coupled to the bowl 4 via seals. The seals prevent contaminated water from circumventing the belt 7 and reaching the downstream end without passing through the belt 7. Virtually any type of seal which can be coupled to a belt can be used. In one embodiment the seal assembly is a metal shape with an integrated seal. The metal shapes can comprise any structural shape of virtually any material. In one embodiment the integrated seal comprises neoprene, viton, and other rubber and plastic based materials and composites.

In one embodiment, the separator system further includes an air blade 9 which is positioned adjacent to a portion of the belt 7. An air blade 9 blows through the oil separator belt 7, cleaning debris from the filter. In one embodiment, and as depicted, the air blade 9 is positioned above the recovered oil tank 6. An air blade 9 pushes air through the belt 7. As it does this, contaminants are forced from the belt 7 and are recovered in the recovered oil tank 6. This cleans the belt 7 before it is reintroduced into the bowl.

Virtually any device which cleans the belt 7 can be utilized. Additional devices include water knives, bristles and brushes, etc., which will all act to grab and remove contaminants from the belt 7. The air knife 9 has several advantages including elimination of a separate water stream. The size, power, and location of the air knife 9 can be adjusted depending upon the desired embodiment. The materials for the air knife can include thermoplastics, stainless, ferrous steels, carbon composites, rubber, metals, etc. The blower units used in the air knife can be air blowers or air compressors. In one embodiment an air knife 9 system comprises an air knife manufactured by Air Control Industries, Inc. of Windos Me.

In one embodiment, the debris removal auger 12 carries debris to the outside of the machine. As depicted, the belt 7 is driven by a belt drive motor 8. The motor 8 can comprise any motor or engine known in the art.

Recovered oil is collected in the recovered oil tank 6. In one embodiment the recovered oil tank 6 comprises a separate vessel than the separator. In another embodiment, and as depicted, the recovered oil tank 6 is located within the same vessel as the separator but is separated within that vessel to prevent mixing of the recovered oil with the bowl 4. The recovered oil pipe 11 carries the recovered oil away from the recovered oil tank 6 for subsequent disposal or reprocessing.

Cleaned water exits the separator through the water outlet pipe 3 located near the bottom of the separator. In one embodiment, the water outlet pipe 3 is located on the downstream segment of the separator unit. The cleaned water can then be disposed or treated further.

In one embodiment, a medium volume self-contained oil contaminated water oil separator and dewatering filter incorporating redundant floating weir oil skimmer is disclosed. In one embodiment the separator is a unique integration and enhancement of oil water separation and filtration technologies to provide an environmentally friendly, scalable, ultra-high efficiency, reduced footprint oil water separation and filtration system. The technology can be adapted, tuned, and utilized for new, existing, temporary, or emergency facilities. This technology is environmentally green. In one embodiment the separator benefits environmental remediation, industrial plant owners, downstream water users, and any other oil from water reclamation activities. This technology can be utilized either in parallel to increase flow rates of wastewater treatment, or in series, to eliminate virtually all oil from a water stream.

In one embodiment the separator utilizes two methods of oil separation from water. First, a gravity separation as described in Stokes Law is performed in the settling and separating bowl 4. The gravity separation is accomplished via the floating weir skimmer 5. As noted, the floating weir skimmer 5 discharges the skimmed oil directly into the recovered oil tank 6. Many oil globules suspended in the water will be too small to separate from the water on a gravity separation basis, so a second recovery method consisting of a filter mesh is incorporated in the system. In one embodiment the filter belt 7 described above comprises a filter mesh. The filter mesh allows water to pass through but separates oil molecules. The oil molecules are aggregated on the filter on the belt 7 in the settling and separating bowl 4, where they are removed from the water via the floating weir skimmer 5. Due to the enhanced oil recovery methods provided in this system, it operates using less power and in a more confined space than competing products. Its ability to recover more oil from wastewater streams utilizing a smaller footprint and less power makes this an environmentally friendly solution to oil water separation and cleanup activities.

Via the utilization of bleeding edge technologies, this unit is less expensive, more power efficient, weighs less, has a smaller footprint, and removes higher percentages of oil from wastewater streams than current technologies offer. For example, other prior oil water separators rely on extended settling periods for adequate separation, and are unable to separate extremely small and entrapped oil particles. Due to their need to settle, they are very large permanent structures. Mechanized systems are also extremely large and permanent, and are extremely power inefficient. However, the instant separator removes much more oil from wastewater much more efficiently, is smaller, lighter, portable, and can be operated in temporary and emergency process streams. This invention uses less energy than competing products and is therefore environmentally friendly. The ability to recover higher percentages of oil that would normally either be disposed of or discharged also qualifies this invention as environmentally friendly.

In operation, in one embodiment, the separator will be optimized for various industries and applications. For example, depending on the industry where the unit is deployed, adjustments will be necessary for the required water volume per time unit, as well as the oil content of the water. Multiple units will be able to be utilized in parallel to increase the total system capacity without affecting overall performance. In one embodiment, the separator can be made by procuring the elements matched to the overall system operating requirements (e.g., flow rate, oil content of water) and assembling into the integrated system. The speed and efficiency of the separator can be controlled and adjusted as necessary by changing, modifying, or scaling one or more parts of the separator. As but one non-limiting example, the material of the belt can affect the quantity of oil caught by the belt.

In one embodiment, to use the invention, the unit will be mounted in an appropriate place, with water lines and oil line correctly connected and routed. Power must be provided to the unit. The unit must be tuned properly, including weir height, belt feed speed, and air volume and force for debris removal.

The separator can be utilized in multiple applications and industries, including emergency cleanup operations, where water comes into contact with petroleum or natural oils and fats. The unit is sized so that transportation is relatively easy, allowing the unit to be deployed in remote or temporary locations easily.

In one embodiment, cleaned water refers to a water whose contaminants have been reduced by greater than 75% of the entering contaminants. In other embodiments the contaminants have been reduced between 75% and 95% of the entering contaminants.

In one embodiment the separation unit will be used as the first operation in a process stream. The contaminated water entering the separation unit is fairly dirty and full of oil, grease, and paraffin. Based on the systems and methods discussed herein, the contaminants in the clean water can be reduced by greater than 75% of the entering contaminants. If the incoming water contains a high percentage of extremely fine solids, such as silt or clay, the separation unit can be modified as necessary to capture the finer particulates. As but one example, a finer membrane can be applied to the belt to grab and capture the finer particulates.

Figure 2:
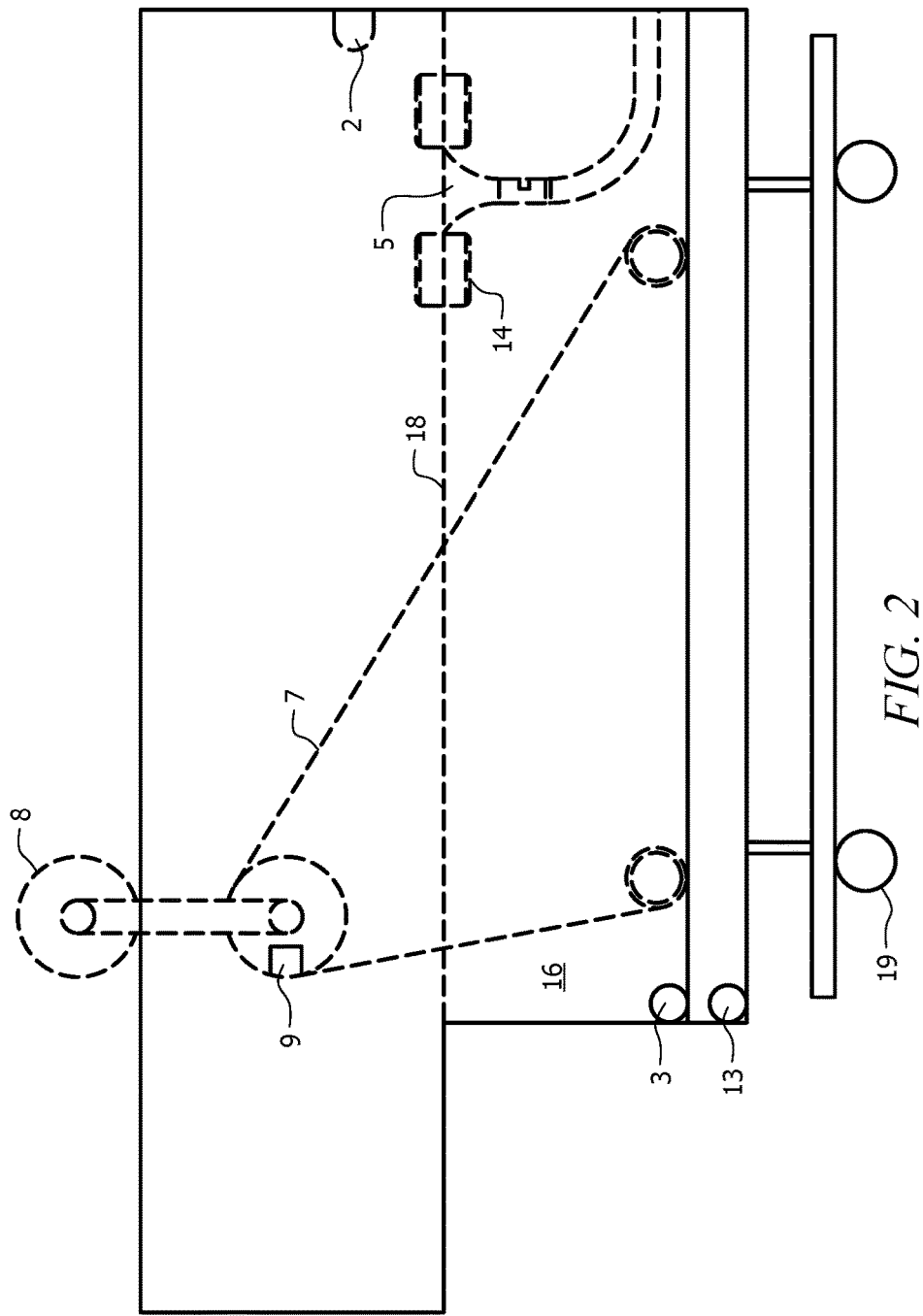
FIG. 2 is a schematic view of the oil separator in another embodiment.

FIG. 2 is a schematic of another embodiment of the separation unit. Like numerals reference the same items found in FIG. 1. As can be seen, FIG. 2 shows an upstream segment 14 and a downstream segment 16. Contaminated water enters through inlet 2 and is introduced into the upstream segment 14. The weir 5 is positioned to float atop of the water level 18. As depicted the weir is supported by floats 15. Accordingly, as previously discussed, light contaminants, including hydrocarbon and oil, will rise to the top of the water level 18. At the top, they can be skimmed by skimmer 5. The water then passes through the belt 7 which separates the upstream 14 and the downstream 16 segments. In one embodiment the belt 7 grabs oil and other contaminants as well as acts as a filter to filter the water. Clean water is removed at exit 3 which is located in the downstream segment 16. The system also includes a drain 13.

The unit depicted is located upon wheels 19. This allows the unit to be moved, transported, and placed in its desired location. The wheels 19 are for illustrative purposes only and should not be deemed limiting. In other embodiments skids or the equivalent can be utilized.

In still other embodiments the unit comprises a permanent structure which is not built to be easily transportable. This will be dependent upon the flow rate, the design size, etc. of the separation unit.

In one embodiment the separation unit is built from a standard shipping container. The shipping container provides the exterior structural walls of the separation unit.

While the invention has been particularly shown and described with reference to a preferred embodiment, it will be understood by those skilled in the art that various changes in form and detail may be made therein without departing from the spirit and scope of the invention.

What is claimed is:

1. A system for the separation of water and contaminants, said system comprising:
    an inlet pipe which directs contaminated water to a bowl;
    a weir skimmer located within said bowl, wherein said weir skimmer recovers contaminants which float atop the contaminated water;
    a continuous filter belt located and traveling within said bowl, wherein said filter belt aggregates entrained contaminants and travels outside and above said bowl, wherein an air blade is positioned adjacent to said filter belt above said bowl;
    an outlet pipe which directs cleaned water out of said bowl; and
    wherein said filter belt divides the bowl into an upstream end upstream from said filter belt and a downstream end downstream from said filter belt, wherein said inlet pipe is located in said upstream end, and wherein said outlet pipe is located in said downstream end, wherein said weir skimmer is located in said upstream end;
    wherein said filter comprises an oil phobic material;
    and wherein said weir skimmer is a floating weir skimmer, and wherein said weir skimmer is coupled to at least one float, and wherein said weir skimmer is fluidly connected to a flexible oil skimmer recovery pipe such that said weir skimmer can freely float and bob along a top surface of said water.

2. The system of claim 1 wherein the weir skimmer is fluidly connected to a recovered oil tank such that recovered oil can be directed to said recovered oil tank.

3. The system of claim 1 wherein said inlet pipe is sized to accommodate between about 5 and 50 gallons per minute of contaminated water through said inlet pipe.

4. The system of claim 1 wherein the height of said skimmer relative to a water level is adjustable, and wherein a phrase break forms in a layer atop said contaminated water in said bowl, said wherein said skimmer is located at a height relative to said phase break such that the top layer of the phase break is recovered by said weir.

5. The system of claim 1 wherein said filter comprises a screen material.

6. The system of claim 1 wherein said filter further comprises a membrane.

7. The system of claim 6 wherein said membrane prevents a majority of oil, grease, and paraffin from passing through said filter.

8. The system of claim 6 wherein said membrane allows water to pass but separates oil particles.

* * * * *